Figure 1:
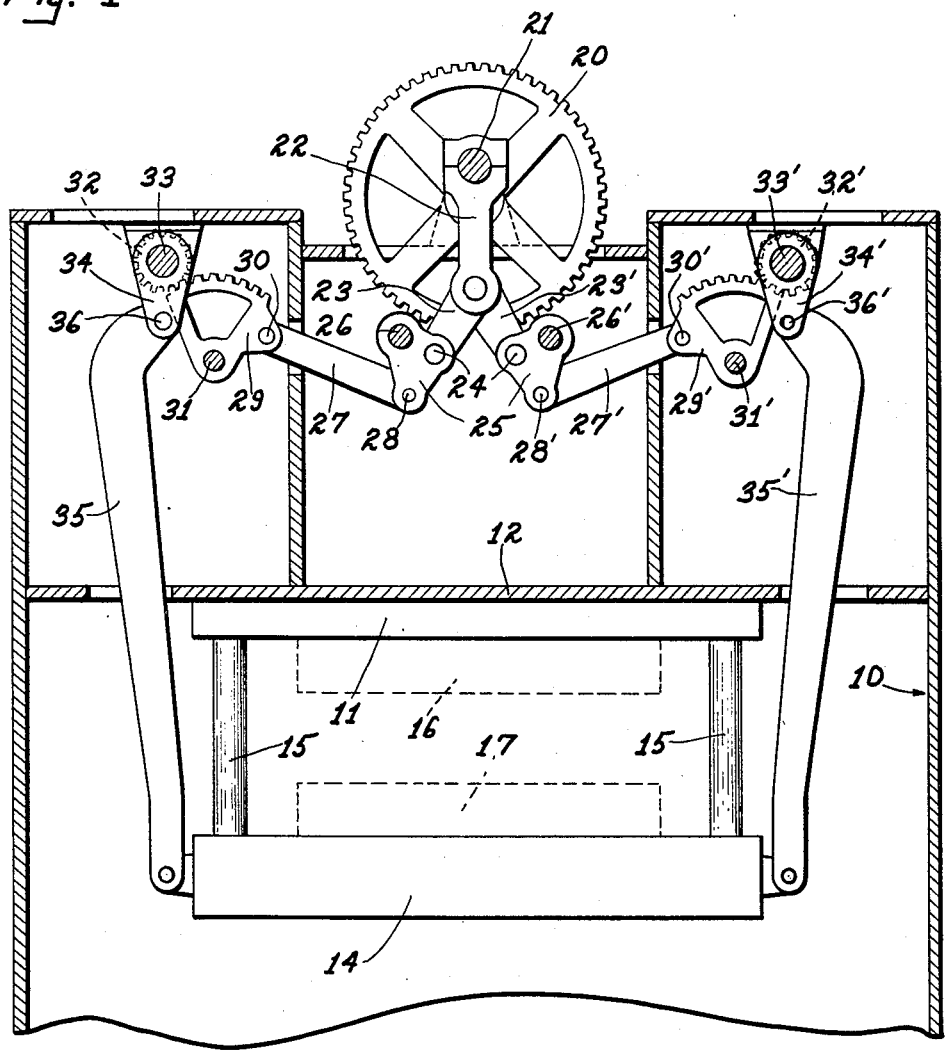

Sept. 6, 1960     W. F. LONGFIELD     2,951,379
PRESS

Filed Feb. 13, 1956     3 Sheets-Sheet 1

INVENTOR.
WILLIAM F. LONGFIELD
BY
ATTORNEY

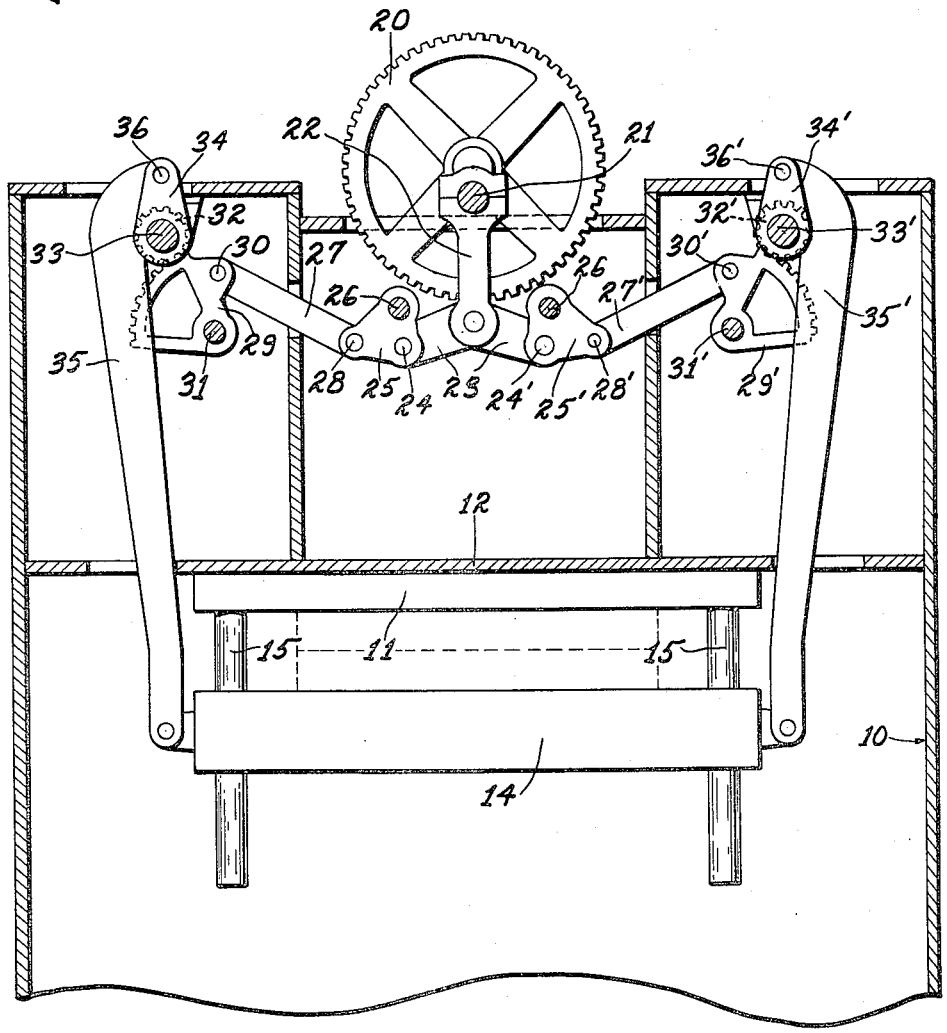

Sept. 6, 1960 W. F. LONGFIELD 2,951,379
PRESS
Filed Feb. 13, 1956 3 Sheets-Sheet 3
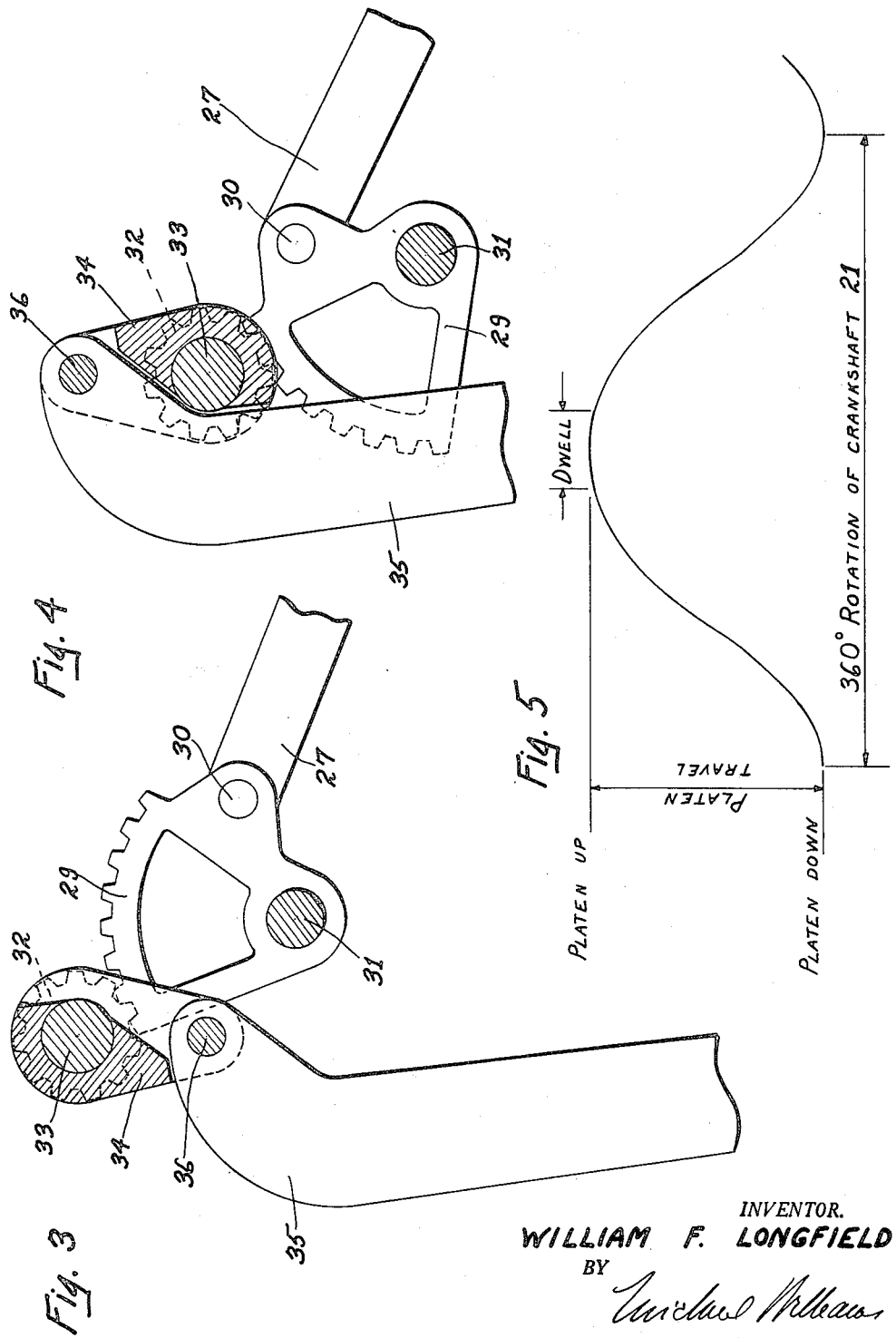
INVENTOR.
WILLIAM F. LONGFIELD
BY
ATTORNEY United States Patent Office 2,951,379
Patented Sept. 6, 1960

2,951,379

PRESS

William F. Longfield, Warren, Ohio, assignor to The Federal Machine and Welder Company, Warren, Ohio, a corporation of Ohio Filed Feb. 13, 1956, Ser. No. 565,084

3 Claims. (Cl. 74—29)

My invention relates to presses of the type having relatively movable platens for supporting work performing members, more particularly my invention relates to welding presses of the type largely used in the automotive industry for high speed fabricating and the principal object of my invention is to produce new and improve presses of such character.

In the drawings accompanying this description and forming a part of this application, there is shown, for purposes of illustration, an embodiment which my invention may assume, and in these drawings:

Figure 1 is a broken sectional view showing representative parts of a press embodying my invention, with operating mechanism shown in one position, Figure 2 is a view similar to Figure 1 with the operating mechanism in another position, Figures 3 and 4 are enlarged, broken sectional views showing portions of the operating mechanism in the various positions, and Figure 5 is a chart showing operating characteristics of the movable platen of the press.

With reference to the drawings, the embodiment of the invention herein disclosed comprises a frame 10 of any suitable construction. The frame 10 is intended to indicate the frame of a welding press which includes relatively movable platens. A usual type of welding press is provided with a fixed upper platen 11 supported from a cross-member 12 of the press, and a lower movable platen 14 which is mounted on guide rods 15, 15 for vertical reciprocatory movement toward and away from the upper stationary platen 11.

In usual welding presses, the entire structure is generally self-sufficient and is provided with connections for fluid under pressure, electrical power, and the like so that piping and wiring may be complete in the press for readily accessible use.

Ordinarily, a welding press is used for high speed fabrication of parts and is largely used by the automotive industry to fabricate metal stampings into automobile components, such as doors for example. The fabrication is ordinarily accomplished by the type of welding known as resistance welding and usually employs several welding guns which are fired when parts are properly aligned and held under suitable pressure.

A welding jig is usually provided to align and hold the various component parts of the assembly to be fabricated and the dotted line representations 16, 17 show complementary parts of a welding fixture which are respectively secured to the upper and lower platens 11 and 14.

Either one, or both, of the fixture parts 16, 17 may carry welding guns, the welding transformers, and other pertinent fabricating equipment, depending upon the requirements of the work to be fabricated. Likewise, the parts to be fabricated may be loaded in either, or both, of the fixture parts 16, 17, depending upon the design of the fixture and the work to be fabricated therein.

Because the lower platen 14 moves vertically and in its lower position is more accessible to the operator, it may be preferable to design the fixture so that the parts to be assembled are loaded in the part 17 and carried, by upward movement of the platen 14, to the part 16. As the fixture parts 16, 17 close on each other, the parts to be assembled are firmly held in located relation and at the proper time the welding guns are fired to complete the assembly.

The assembly operation is usually completed in one stroke of the press and normally the parts are loaded in the lower figure part 17 and then the platen 14 is caused to move upwardly into working arrangement with the upper fixture part, the parts are welded during the upper end of the stroke of platen 14, and the latter is returned to its lower position to permit removal of the fabrication and subsequent loading of component parts.

It is extremely desirable that the platen 14 start upwardly with a gradually accelerating movement and return to its lower position with a gradually decelerating movement. Gradual upward acceleration is desirable to insure against dislocation of any of the parts carried by the lower fixture part 17 and gradual downward deceleration is desirable to bring the large moving mass to a gradual halt and thus insure against jolting action which would have a detrimental effect on the structure as a whole.

It is of equal importance to provide a dwell at the upper part of the stroke of the platen 14 so that the welding guns may engage with and weld the parts held in the fixture with uniformity.

Heretofore, crank movement has been used to provide harmonic motion to actuate the platen 14 but such motion alone was not entirely satisfactory in that the parts in the fixture were welded during substantial motion of the platen and satisfactory and uniform welds were not accomplished.

My invention has overcome the disadvantages of the prior art and provides not only a gradual descent of the platen during the lower portion of its stroke but also provides a substantial dwell at its upper stroke portion. In running through the stroke in accordance with my invention, the platen starts slowly from its lowermost position, accelerates rapidly through its intermediate part of the stroke to facilitate production rate, and decelerates as it approaches the upper portion of the stroke and remains substantially stationary at the upper stroke portion for a predetermined period of time to enable the welding to be accomplished. After the dwell, the platen moves down with accelerating movement until it approaches the lower portion of its stroke, whereupon it decelerates and comes to a gradual rest. The chart shown in Figure 5 indicates the movement of the platen 14 during a one stroke cycle.

The mechanism herein disclosed to effect the desired platen motion comprises a relatively large gear 20 which may be driven in any suitable manner from a power source. The gear 20 rotates a crank 21 to which one end of a connecting rod 22 is journalled. It will be appreciated that rotation of the crank 21 will produce harmonic motion which is transmitted to the connecting rod 22.

To further effect the desired movement of the platen 14, the following mechanism is provided in mirror relation on opposite sides of the connecting rod, duplicate parts being identified by the same reference characters one of which is primed: As seen in Figures 1 and 2 two toggle links 23, 23' are pivotally connected to the lower end of the connecting rod 22, each link being pivotally connected at 24 to one arm of a bell crank lever 25.

Each bell crank lever 25 is rockable about a shaft 26 and connecting arms 27, 27' are pivotally connected to a respective one of the other arms of the bell crank levers, as shown at 28. The connecting arms 27 are also pivotally connected to respective gear sectors 29, 29', as shown at 30. Each gear sector is rockable about a shaft 31 and meshes with a gear 32 fixed to a shaft 33.

Secured to each shaft 33 for rotation therewith, is a lever arm, or crank, 34. In the embodiment herein disclosed, each arm 34 is rotatable through approximately 180° and the harmonic motion it produces is synchronized with the harmonic motion produced by the crank 21. To illustrate this synchronization, attention is directed to Figures 1 and 2 wherein it is shown that the longitudinal axes of the lever arms are substantially parallel with the longitudinal axis of the connecting rod 22 in the respective lower and upper ends of the stroke of the platen. It will be appreciated that exact alignment may not be critical and that the lever arms may swing through an arc somewhat less than 180°. A link 35 is pivoted at 36 to each of the lever arms 34, the lower end of each link 35 being pivotally connected at 37 to the platen 14.

It will be appreciated that in presses for light work only one of the mirror reproduced mechanisms may be necessary and in such case provision may be made to provide for rectilinear movement of the lower end of the connecting rod 22, as by means of a slide box. In heavy presses the entire mechanism shown in Figures 1 and 2 may be duplicated so that the lower ends of the four links 35 (in that case) are pivotally connected to the four corners of the platen 14.

In operation, and with the platen 14 in its lower position, as shown in Figure 1, the parts to be fabricated may be placed in the lower fixture part 17 and the press actuated to cause upward movement of the platen 14. It will be noted that at the start of motion (referring to the disposition of parts as shown in Figures 1 and 2) the longitudinal axes of the lever arms 34 and the crank 21 are substantially vertical so that the harmonic motion produced thereby provides a slow start of the platen 14. The platen 14 rapidly accelerates by reason of the fact that the lever arms 34 and crank 21 swing through their horizontal positions and thereafter motion of the platen is decelerated because the lever arms 34 and crank 22 approach their opposite vertical position.

The toggle links 23, 23' modify the harmonic motion produced by the lever arms 34 and crank 21 and, in the upper portion of platen stroke, little movement is transmitted through the toggle links 23, 23' since they are approaching an in-line relationship. Accordingly, in the uppermost position of the stroke, the platen is held substantially stationary for a predetermined amount of time to permit all of the welding to be performed.

Thereafter, the platen moves downwardly with accelerating movement until the lever arms 34 and crank 21 pass through their horizontal positions, whereupon the platen movement is gradually decelerated so that it may come to rest at the bottom part of its stroke without a jarring action which is otherwise caused when a rapidly moving mass is suddenly brought to a halt.

As best seen in Figures 3 and 4, the upper end of each link 35 is of generally goose-neck form to enable the pivot connection 36 to be disposed below or above the shaft 33, respectively, in the lower and upper positions of the platen 14 and thus permit rotation of the lever arms 34 through substantially 180°. Each lever arm is slotted, as shown at 40, to provide clearance for passage of the goose-neck portion of the respective link 35.

In view of the foregoing it will be apparent to those skilled in the art that I have accomplished at least the principal object of my invention and it will also be apparent to those skilled in the art that the embodiment herein described may be variously changed and modified, without department from the spirit of the invention, and that the invention is capable of uses and has advantages not herein specifically described, hence it will be appreciated that the herein disclosed embodiment is illustrative only, and that my invention is not limited thereto.

I claim:

1. In a press construction having a movable platen reciprocable through a stroke toward and away from a stationary platen, means for reciprocating said movable platen and providing a slow rate of travel at the bottom of the stroke and a dwell at the top of the stroke, comprising a crank rotatable from a power source, a connecting rod having one end journalled to said crank, a toggle link having one end pivotally connected to the other end of said connecting rod, a bell-crank lever having one arm pivotally connected to the other end of said toggle link, a connector member having one end pivotally connected to the other arm of said bell-crank lever, a gear sector having pivotal connection with the opposite end of said connector member whereby said gear sector is rocked about its axis by movement of said connector member, a lever mounted for rotation by gear connection with said gear sector, and a link having one end pivotally connected to said lever and the opposite end pivotally connected to said movable platen, the harmonic motion of said crank and said lever being synchronized with each other and with the movement of the toggle link, and modified by the latter to produce the variation in rate of travel of said movable platen.

2. In a press construction having a movable platen reciprocable through a stroke toward and away from a stationary platen, means for reciprocating said movable platen and providing a slow rate of travel at the bottom of the stroke and a dwell at the top of the stroke, comprising a crank rotatable from a power source, a connecting rod having one end journalled to said crank, and the following mechanism disposed in mirror relation to opposite sides of said connecting rod, including a pair of toggle links each having one end pivotally connected to the other end of said connecting rod, a pair of bell-crank levers, each having a corresponding arm pivotally connected to a respective other end of said toggle links, a pair of connector members each having one end pivotally connected to a respective one of the other corresponding arms of said bell-crank levers, a pair of gear sectors having pivotal connection with respective ones of the opposite ends of said connector members whereby said gear sectors are each rocked about their respective axes by movement of said connector members, a pair of levers mounted for rotation and each rotatable by gear connection with respective sectors, and a pair of links each having one end pivotally connected to a respective lever and the opposite end pivotally connected to spaced parts of said movable platen, the harmonic motion of said crank and said levers being synchronized with each other and with the movement of the toggle links, and modified by the latter to produce the variation in rate of travel of said movable platen.

3. In a press construction having a movable platen reciprocable through a stroke toward and away from a stationary platen, means for reciprocating said movable platen and providing a slow rate of travel at the bottom of the stroke and a dwell at the top of the stroke, comprising a crank rotatable from a power source, a connecting rod having one end journalled to said crank, and the following mechanism disposed in mirror relation on opposite sides of said connecting rod, including a pair of toggle links each having one end pivotally connected to the other end of said connecting rod, a pair of bell-crank levers, each having a corresponding arm pivotally connected to a respective other end of said toggle links, a pair of connector members each having one end pivotally connected to a respective one of the other corresponding arms of said bell-crank levers, a pair of gear sectors having pivotal connection with respective ones of the opposite ends of said connector members whereby said gear sectors are each rocked about their respective axes by movement of said connector members, a pair of levers mounted for rotation and each rotatable by gear connection with respective sectors, and a pair of links each having one end pivotally connected to a respective lever and the opposite end pivotally connected to spaced parts of said movable platen, the harmonic motion of said crank and said levers being synchronized with each other and with the movement of the toggle links, and modified by the latter to produce the variation in rate of travel of said movable platen, each of said links having a goose-neck formation adjacent its pivotal connection with a respective lever to permit such pivotal connection to swing about the axis of rotation of such lever in an arc approximately 180°.

References Cited in the file of this patent
UNITED STATES PATENTS

| | | |
|---|---|---|
| 1,433,627 | Klocke | Oct. 31, 1922 |
| 1,468,304 | Klocke | Sept. 18, 1923 |
| 2,550,063 | Johansen | Apr. 24, 1951 |
| 2,822,696 | Staecker et al. | Feb. 11, 1958 |
| 2,896,457 | Longfield | July 28, 1959 |